US011945178B2

(12) United States Patent
Fallon et al.

(10) Patent No.: US 11,945,178 B2
(45) Date of Patent: Apr. 2, 2024

(54) METHODS AND EQUIPMENT FOR FORMING TUBES OF FIBROUS MATERIAL

(71) Applicant: British American Tobacco (Investments) Limited, London (GB)

(72) Inventors: Gary Fallon, London (GB); Arnold Herholdt, Stellenbosch (ZA); Gerhard Le Roux, Stellenbosch (ZA); John Richardson, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 528 days.

(21) Appl. No.: 16/496,612

(22) PCT Filed: Mar. 15, 2018

(86) PCT No.: PCT/GB2018/050661
§ 371 (c)(1),
(2) Date: Sep. 23, 2019

(87) PCT Pub. No.: WO2018/172742
PCT Pub. Date: Sep. 27, 2018

(65) Prior Publication Data
US 2021/0106047 A1 Apr. 15, 2021

(30) Foreign Application Priority Data

Mar. 24, 2017 (GB) ...................................... 1704692
Mar. 24, 2017 (GB) ...................................... 1704700

(51) Int. Cl.
*A24D 3/02* (2006.01)
*B29B 15/12* (2006.01)
(Continued)

(52) U.S. Cl.
CPC .......... *B29C 70/523* (2013.01); *A24D 3/0291* (2013.01); *B29B 15/122* (2013.01);
(Continued)

(58) Field of Classification Search
CPC ...... A24D 3/02; A24D 3/0229; A24D 3/0233; A24D 3/0237; A24D 3/0241; A24D 3/0283; A24C 5/56; A24C 5/565
(Continued)

(56) References Cited

U.S. PATENT DOCUMENTS 3,095,343 A * 6/1963 Berger ................. A24D 3/0233
28/283
3,684,622 A * 8/1972 Goldsworthy ........ B29C 70/528
156/441

(Continued)

FOREIGN PATENT DOCUMENTS

EP 0224892 A1 6/1987
EP 2548625 A1 1/2013

(Continued)

OTHER PUBLICATIONS

British Search Report for corresponding application GB1704692.1: Report dated Jun. 8, 2017.
(Continued)

*Primary Examiner* — Philip Y Louie
*Assistant Examiner* — Sonny V Nguyen
(74) *Attorney, Agent, or Firm* — CANTOR COLBURN LLP

(57) ABSTRACT

Equipment for forming a tubular rod of fibrous material comprises: a gathering station constructed to receive a continuous supply of fibres and to gather the fibres into a bundle as the fibres advance through the equipment; a divider arranged in the path of the fibres through the equipment and constructed to from a cleft along the length (Continued)

of the bundle as it advances through the equipment; a mandrel positioned in the path of the bundle of fibres in alignment with the divider and constructed to form the cleft into a passage through the bundle of fibres as the bundle of fibres advances over the mandrel; and a die constructed and arranged to cooperate with the mandrel to form the fibres in a tubular configuration around the mandrel.

19 Claims, 12 Drawing Sheets

(51) Int. Cl.
| | |
|---|---|
| *B29C 70/52* | (2006.01) |
| *B29K 101/12* | (2006.01) |
| *B29K 105/08* | (2006.01) |
| *B29L 31/14* | (2006.01) |

(52) U.S. Cl.
CPC .......... *A24D 3/0237* (2013.01); *B29C 70/521* (2013.01); *B29C 70/526* (2013.01); *B29C 70/528* (2013.01); *B29K 2101/12* (2013.01); *B29K 2105/08* (2013.01); *B29L 2031/14* (2013.01)

(58) Field of Classification Search
USPC ...................................................... 493/42, 46
See application file for complete search history.

(56) References Cited

U.S. PATENT DOCUMENTS

| | | | | |
|---|---|---|---|---|
| 3,774,508 | A | * | 11/1973 | Berger ................. A24D 3/0283 493/47 |
| 3,802,817 | A | | 4/1974 | Matsuki |
| 3,826,177 | A | | 7/1974 | Berger |
| 3,860,011 | A | | 1/1975 | Norman |
| 3,943,832 | A | * | 3/1976 | Sexstone ................. A24D 3/04 493/42 |
| 4,088,065 | A | | 5/1978 | Hall |
| 4,115,498 | A | * | 9/1978 | Kissell ...................... B28B 1/52 264/165 |
| 4,286,005 | A | | 8/1981 | Berger |
| 4,340,563 | A | | 7/1982 | Appel |
| 4,508,525 | A | | 4/1985 | Berger |
| 4,549,875 | A | | 10/1985 | Pryor |
| 4,770,193 | A | * | 9/1988 | Pryor ...................... A24D 3/022 131/342 |
| 4,812,112 | A | | 3/1989 | Balk |
| 5,382,153 | A | | 1/1995 | Nettelnstroth |
| 5,911,224 | A | | 6/1999 | Berger |
| 6,499,981 | B1 | | 12/2002 | Yoshida |
| 7,132,071 | B2 | | 11/2006 | Smith |
| 8,591,683 | B2 | | 11/2013 | Fox |
| 2004/0238991 | A1 | | 12/2004 | Smith |
| 2005/0008728 | A1 | | 1/2005 | Wilkie |
| 2011/0293764 | A1 | | 12/2011 | Hartge |
| 2013/0023395 | A1 | | 1/2013 | Nakamura |
| 2014/0243178 | A1 | | 8/2014 | Matern |

FOREIGN PATENT DOCUMENTS

| | | |
|---|---|---|
| EP | 2641484 A2 | 9/2013 |
| GB | 1526151 | 9/1978 |
| JP | 52104577 | 9/1977 |
| RU | 53290 U1 | 5/2006 |
| UA | 28376 U | 12/2007 |
| WO | 9516369 A1 | 6/1995 |
| WO | 0141590 A1 | 6/2001 |
| WO | 03085185 A2 | 10/2003 |
| WO | 2004104485 A2 | 12/2004 |
| WO | 2011114440 A1 | 9/2011 |
| WO | 2012131986 A1 | 10/2012 |
| WO | 2015011830 A1 | 1/2015 |
| WO | 2015028812 A1 | 3/2015 |
| WO | 2016097016 A1 | 6/2016 |
| WO | 2018172742 A1 | 9/2018 |

OTHER PUBLICATIONS

British Search Report for corresponding application GB1704700.2; Report dated Jun. 22, 2017.
Demand for International Preliminary Examination for corresponding application PCT/GB2017/052766 filed Sep. 18, 2017; dated Jul. 30, 2018.
International Preliminary Report on Patentability for corresponding applicating PCT/GB2018/050668 filed Mar. 15, 2018; dated Apr. 11, 2019.
International Preliminary Report on Patentability for corresponding application PCT/GB2017/052766 filed Sep. 18, 2017; dated Jan. 28, 2019.
International Preliminary Report on Patentability for corresponding application PCT/GB2018/050661 filed Mar. 15, 2018; dated Jun. 25, 2019.
International Search Report for corresponding application PCT/GB2018/050668 filed Mar. 15, 2018; dated Jun. 13, 2018.
International Search Report for corresponding application PCT/GB2017/052766 filed Sep. 18, 2017; dated Dec. 7, 2017.
International Search Report for corresponding application PCT/GB2018/050661 filed Mar. 15, 2018; dated Jun. 7, 2018.
International Search Report for corresponding application PCT/GB2018/050670 filed Mar. 15, 2018; dated Jun. 6, 2018.
Written Opinion of the International Searching Authority for corresponding application PCT/GB2018/050668 filed Mar. 15, 2018; dated Jun. 13, 2018.
Written Opinion of the International Searching Authority for corresponding application PCT/GB2017/052766 filed Sep. 18, 2017; dated Dec. 7, 2017.
Written Opinion of the International Searching Authority for corresponding application PCT/GB2018/050661 filed Mar. 15, 2018; dated Jun. 7, 2018.
Written Opinion of the International Searching Authority for corresponding application PCT/GB2018/050670 filed Mar. 15, 2018; dated Jun. 6, 2018.
Chinese Search Report for corresponding application 201880034418.0 filed Mar. 15, 2018; Report dated Apr. 2, 2021.
Russian Search Report for corresponding application 2019129856/05 filed Mar. 15, 2018; Report dated Mar. 25, 2020.
European Search Report for corresponding application EP23172740; Report dated Aug. 17, 2023.

* cited by examiner

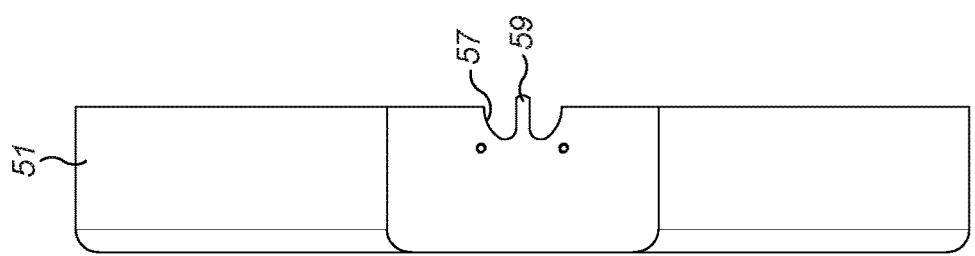
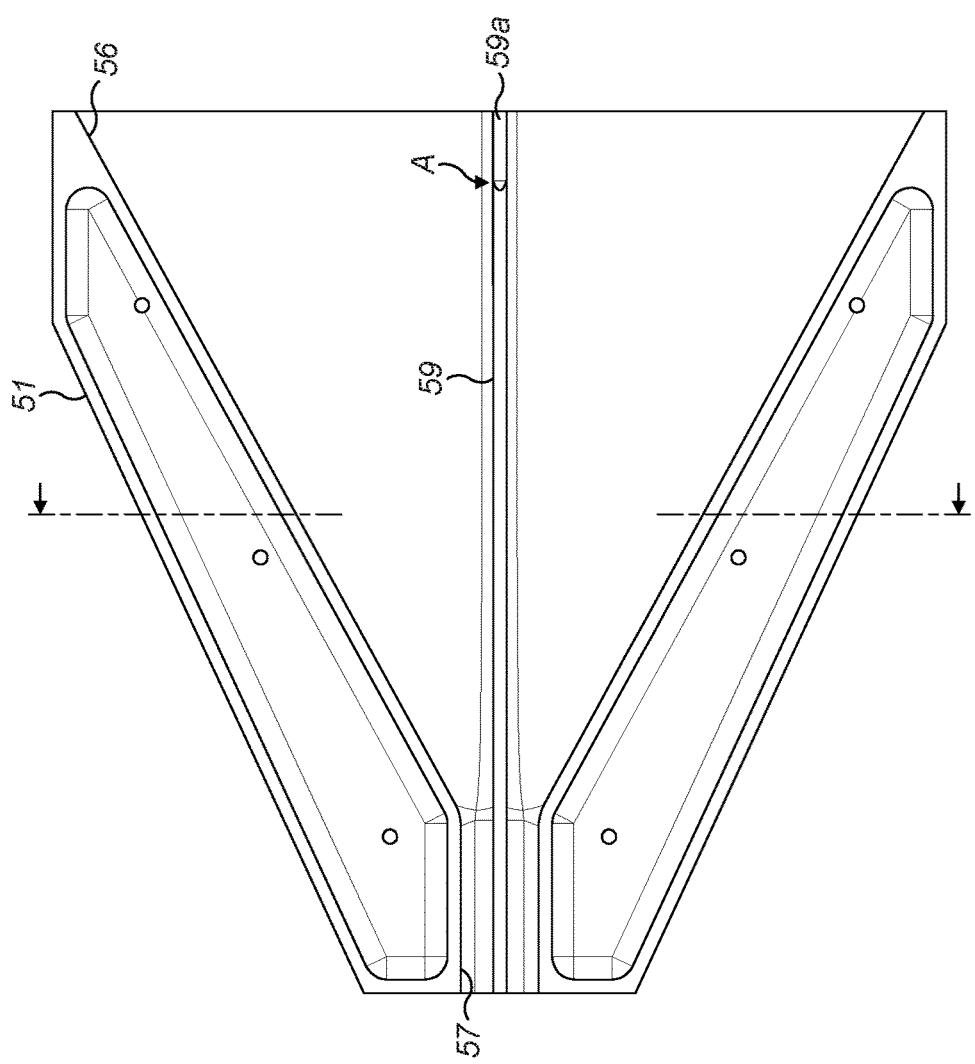
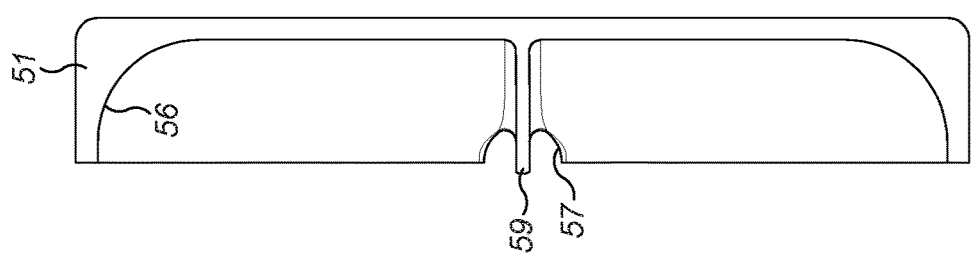
FIG. 4C
FIG. 4B
FIG. 4A

METHODS AND EQUIPMENT FOR FORMING TUBES OF FIBROUS MATERIAL

FIELD OF THE INVENTION

This patent specification relates to methods and equipment for forming tubes of fibrous material, in particular tubular filter rods for use in cigarettes

BACKGROUND

Tubular rods of fibrous material can be formed by gathering fibres into an elongated bundle, forming the fibres of the bundle around a mandrel in a tubular configuration, and separating the resulting fibres from the mandrel as a tubular rod with a central axial passage. However, where the bundle of fibres is formed around the mandrel in a continuous process, the bundle may from time to time become misaligned with the mandrel due to variations in the density fibres within the bundle, with the result that the axis of the central passage becomes misaligned with the central axis of the tube, so that the wall thickness of the tube is not uniform, or the tubular configuration collapses completely. The process and equipment must then be halted and restarted, causing delays and additional costs in production. This happens particularly if the bundle of fibres is gathered from a feed stock of fibres of low density, or if the tubes are formed at higher speeds.

SUMMARY

In one embodiment, a method of forming a tubular rod of fibrous material comprises gathering fibres into an elongated bundle, parting the fibres to form a cleft along the length of the bundle, introducing a mandrel into the cleft, closing the fibres of the bundle around the mandrel in a tubular configuration, and separating the fibres from the mandrel as a tubular rod.

In another embodiment, a continuous manufacturing process for producing a tubular rod of fibrous material comprises gathering the fibres into a bundle, parting the fibres along the length of the bundle advances to form a radial cleft, advancing the bundle over a mandrel positioned in the recess, closing the fibres of the bundle around the mandrel, treating the bundle to form a stable tubular configuration, and removing the bundle from the mandrel.

Treatment of the bundle of fibres may for example comprise advancing the bundle through a constriction that defines a desired circumferential profile for the bundle of fibres, and introducing a treatment fluid for curing the fibres introduced into the bundle as the fibres enter the constriction.

In another embodiment, equipment for forming a tubular rod of fibrous material comprises gathering equipment constructed to receive a continuous supply of fibres and to gather the fibres into a bundle as the fibres advance through the equipment; a divider arranged in the path of the fibres through the equipment and constructed to from a cleft along the length of the bundle as it advances through the equipment; a mandrel positioned in the path of the bundle of fibres in alignment with the divider and constructed to form the cleft into a passage through the bundle of fibres as the bundle of fibres advances over the mandrel; and a die constructed and arranged to cooperate with the mandrel to form the fibres in a tubular configuration around the mandrel.

In one embodiment, the die has a central passage there through, and the mandrel comprises a rod mounted within the central passage to define an annular space between the die and the mandrel.

The equipment may further comprise treatment equipment constructed and arranged to cure or fix the fibres in the tubular configuration. The construction of the treatment equipment will vary according to the nature of the fibrous material and the technique used to fix the final form of the bundle of fibres. For example, the fibres may be formed from a thermoplastics material that can be softened by the application of heat, causing the fibres to fuse together at their points of contact. With such fibres, the treatment station is constructed to apply heat to the fibres whilst supported on the mandrel. For this purpose, the treatment station may comprise a steam chamber constructed to accommodate the passage of the fibres therethrough.

In one embodiment, the treatment station comprises a housing defining a chamber into which a treatment fluid may be introduced, and the die is positioned within the housing and is provided with one or more conduits for delivering the treatment fluid from the chamber to the fibres.

The formation of a cleft in the fibrous bundle prior to introduction of the mandrel facilitates the formation of a tube, and reduces the risk of failure as a result of misalignment of the mandrel with the bundle of fibres.

The cleft may divide the bundle into separate parts, e.g. two distinct bundles, or, alternatively the cleft may be in the form of a recess extending partially through the bundle, e.g. radially from the periphery towards the centre of the bundle, for example 20%, 30%, 40%, 50% 60%, 70% or 80% through the thickness of the bundle.

The method and equipment disclosed herein may be used to process fibres from a feedstock of fibrous material, e.g. a bale of fibre tow, or from fibres supplied directly from a continuous manufacturing process or equipment, e.g. by melt-blowing, melt-spinning, electro-spinning processes and equipment, or by other processes or equipment for producing fibres know to those skilled in the art. A web of entangled fibres produced in any of these ways, or by another process, may then be gathered into an elongated bundle using the method or equipment disclosed herein.

Fibre tow is formed from crimped fibres, for example of cellulose acetate. The crimping of the fibres increases the elasticity of the fibrous bundle therefrom (i.e. the extent to which the fibres can be stretched without breaking). This in turn affects the resilience of the tubes or rods formed therefrom. In a bale of tow, the fibres are highly crimpled. Before use, the tow is usually "bloomed", or treated to reduce the crimping, and to release the fibres from each other. The crimp is not entirely eliminated from the fibres. A degree of crimping of the fibres provides elasticity to the tow material, which facilitates the formation of the fibre bundle into the desired shape, such as a rod or a tube.

The method and equipment disclosed herein are exemplified by the production of fibres by melt-blowing. In a typical melt blowing process, fibre-forming polymer is extruded from one or more orifices into convergent streams of hot gas (for example air or possibly an inert gas). The gas streams blow the polymer emerging from the orifices into thin streams of molten polymer, which then solidify to form small diameter fibres of filaments. The fibres are entrained in the stream of gas and may be collected, for example by directing the stream of gas and fibres on to a collection surface. In contrast to tow fibres, meltblown fibres are essentially linear, and uncrimped. A bundle of meltblown fibres therefore has relatively low elasticity and the individual fibres are more prone to breaking. Elasticity in a bundle of meltblown fibres arises primarily from the tangled web structure of the bundle that is created by the accumulation of the fibres into a web, mat or bundle.

Application of heat to the web, for example by heated treatment fluid such as steam or water vapour in air or an inert gas, lubricates the fibres and facilitates disentanglement and formation of a more ordered web of the fibres for formation into a desired linear structure such as a rod or tube.

When the bundle fibres is passed through a die, the application of heat causes the fibre bundle to stretch. The longer the fibres remain in the forming section of the die, the more the fibre bundle stretches. The extent to which the fibre bundle is stretched in the die affects the final density, shape, size and structure of the finished product.

A plasticiser may be used to facilitate the curing of the fibre bundle into a formed shape by bonding together at their points of contact. The plasticiser may be applied to the fibre bundle, for example by spraying. This technique is commonly used on crimped fibre tow. For meltblown fibres, the plasticiser is commonly incorporated in the polymer material from which the fibres are formed and is released therefrom on the application of heat to the fibres sufficient to cause the polymer to soften or to melt.

In one embodiment, the gathering station or equipment may be of a construction typically used in equipment in this field and known as a forming cone. The forming cone may for example comprise a structure that defines a longitudinally extending passage of tapering configuration between an inlet for receiving the fibres and an outlet from which the web of fibres may be withdrawn as a bundle.

The divider may comprise a wall, pin, blade, plough or other formation mounted in the path of the fibres through the equipment, upstream of the mandrel. The divider may be shaped at its upstream end to facilitate the formation of a cleft in the bundle fibres. For example, the divider may present a curved or v-shaped face or edge to the bundle of fibres. In one embodiment the divider is positioned in the forming cone. For example, in one embodiment the divider comprises a wall in the passage of the forming cone extending between the inlet and the outlet.

In one embodiment, equipment for forming a web of fibres comprises a forming cone having an inlet for receiving a web of fibres, an outlet from which the web of fibres may be withdrawn as a bundle and defining a longitudinally extending passage of tapering configuration between the inlet and the outlet, the forming cone having a divider positioned within the passage and projecting across the outlet to form a longitudinally extending cleft in the bundle of fibres.

The equipment may comprise a mandrel positioned in alignment with the outlet of the forming cone to receive the bundle of fibres from the outlet of the forming cone and around which a central passage may be formed in the bundle of fibres.

In one embodiment of the equipment, the mandrel is mounted in a tubular casing mounted around the path of the bundle of fibres through the machine. The mandrel may for example comprise a rod that is elongated in the direction of movement of the bundle of fibres and mounted in the tube along an axis coincidental or parallel to the axis of the tubular casing. In an embodiment with such a construction, the divider may comprise a support connecting the mandrel to the tubular casing.

In one embodiment, the mandrel may be configured to deliver treatment fluid, such as steam or hot water vapour, to the fibres as a bundle of the fibres passes over the mandrel. For example, the mandrel may be provided with a passage having an inlet for the introduction of the treatment fluid and an outlet communicating with surface of the mandrel.

This specification also discloses a method of forming a tubular rod of fibrous material comprising gathering fibres into an elongated bundle, closing the fibres of the bundle around the mandrel in a tubular configuration, and separating the fibres from the mandrel as a tubular rod, wherein a treatment fluid is introduced into the bundle through the mandrel.

This specification further discloses equipment for forming a tubular rod of fibrous material comprising a mandrel constructed to form a passage through the bundle of fibres as the bundle of fibres advances over the mandrel, wherein the mandrel is provided with a passage having an inlet for the introduction of the treatment fluid and an outlet communicating with surface of the mandrel.

The formation of the fibres into a rod or tube around the mandrel may or be facilitated if the treatment fluid is introduced in a direction that is not opposed to the direction of movement of the bundle over the mandrel. For example, the passage in the mandrel may be arranged to discharge fluid in a direction generally radially, or generally at right angles to the direction of movement of the fibres, at an acute angle thereto, for example at an angle not significantly greater than 90° to the direction of movement of the bundle of fibres, possibly 10, 20, 30, 40, 50, 60, 70, or 80 degrees to the direction of movement. In these configurations, the fluid is directed in to the fibre bundle generally in the downstream direction. Even if directed at angles marginally greater than 90° (e.g. up to 95° to the direction of movement), the fluid flow may not significantly oppose the movement of the bundle of fibres over the mandrel, and the kinetic energy of the stream of fluid may still assist the compression and shaping of the bundle of fibres around and over the mandrel. At directions significantly greater than 90°, e.g. from 100 to 180°, component of the force exerted on the fibres by the fluid will become significantly contrary to the movement of the fibre bundle over the mandrel and will oppose compression and shaping of the fibre bundle.

Embodiments of the equipment and methods will now be described, by way of example only, with reference to the accompanying drawings, in which:

FIG. 4A is an elevation of the upper part of the forming cone of FIG. 3 from one end;

FIG. 4B is a plan from below of the part shown in FIG. 4A;

FIG. 4C is an elevation of the part shown in FIG. 4A from the opposite end;

Figure 1:
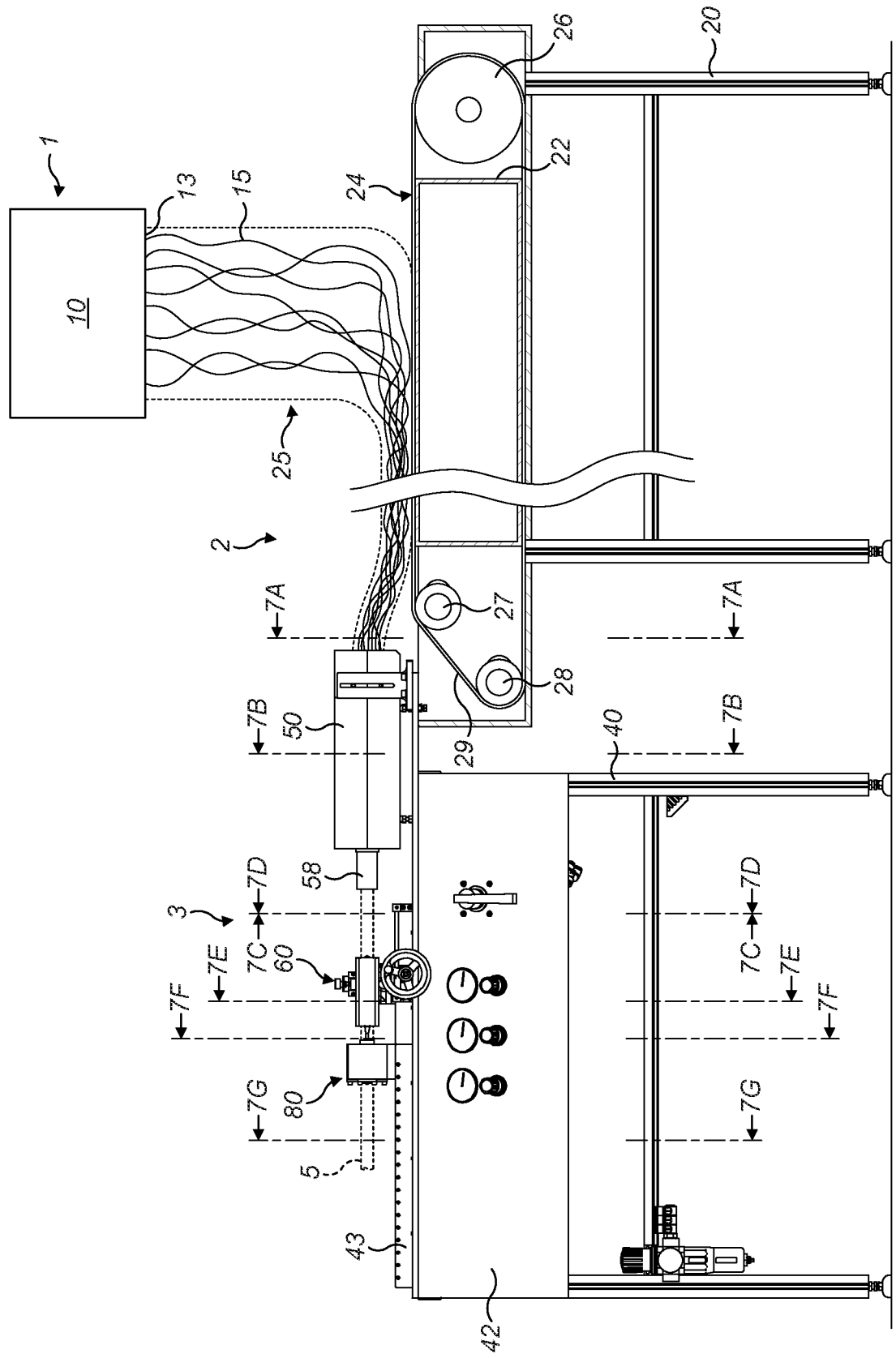
FIG. 1 is a schematic side elevation, partly in vertical cross section, and cut to reduce the width, of an embodiment of equipment for forming a tubular rod of fibrous material.
Figure 5A:
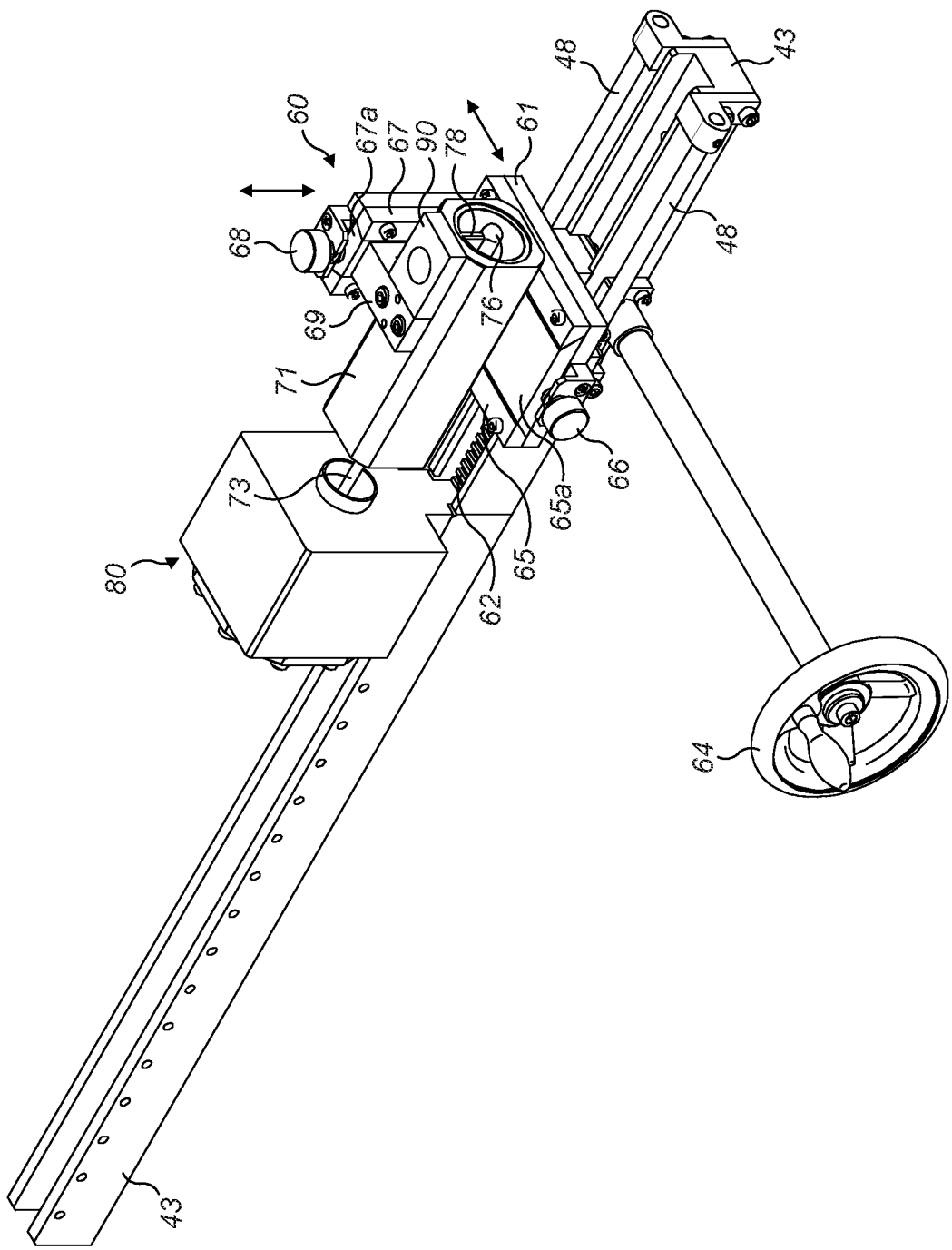
FIG. 5A is a perspective view from above and one end, on an enlarged scale, of embodiments of a mandrel assembly and a treatment assembly that may be used in the equipment of FIGS. 1 and 2.
Figure 5B:
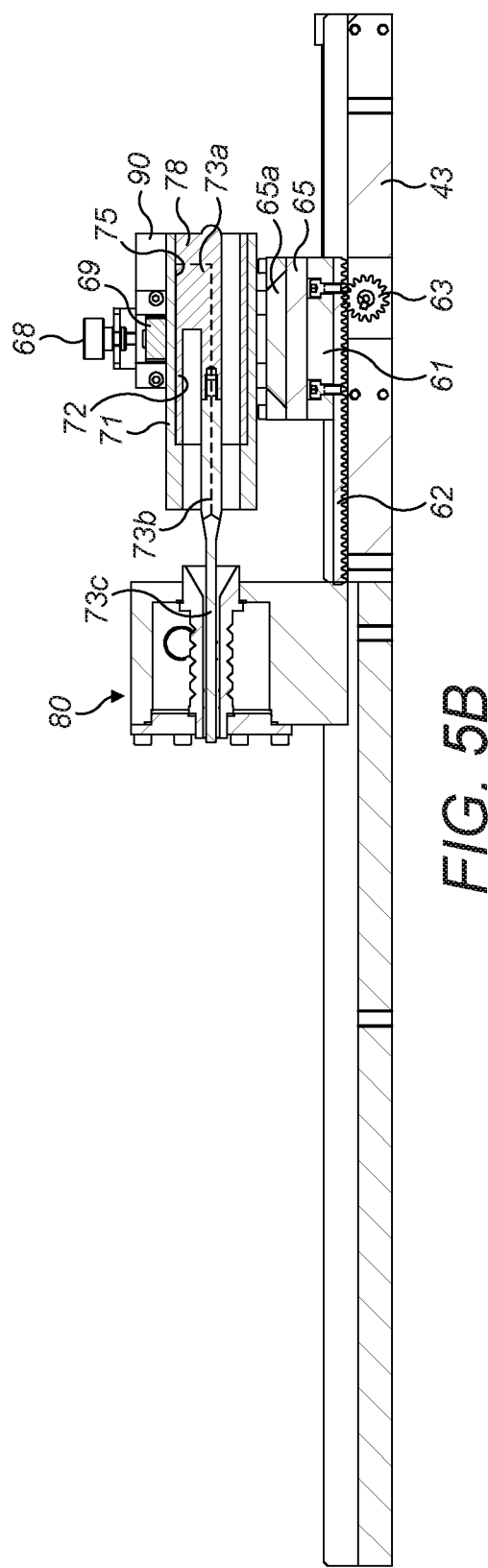
FIG. 5B is a longitudinal vertical cross-section of the assemblies of FIG. 5A.
Figure 5C:
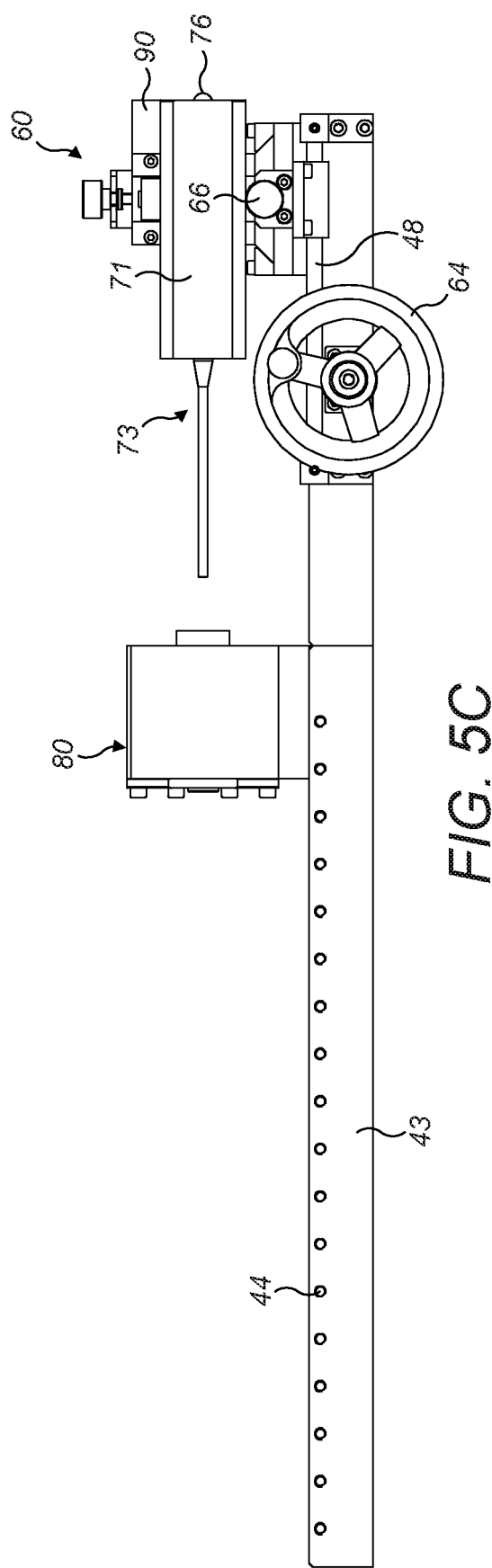
FIG. 5C is a side elevation of the equipment shown in FIGS. 5A and 5B, with the assemblies separated from each other.
Figure 5D:
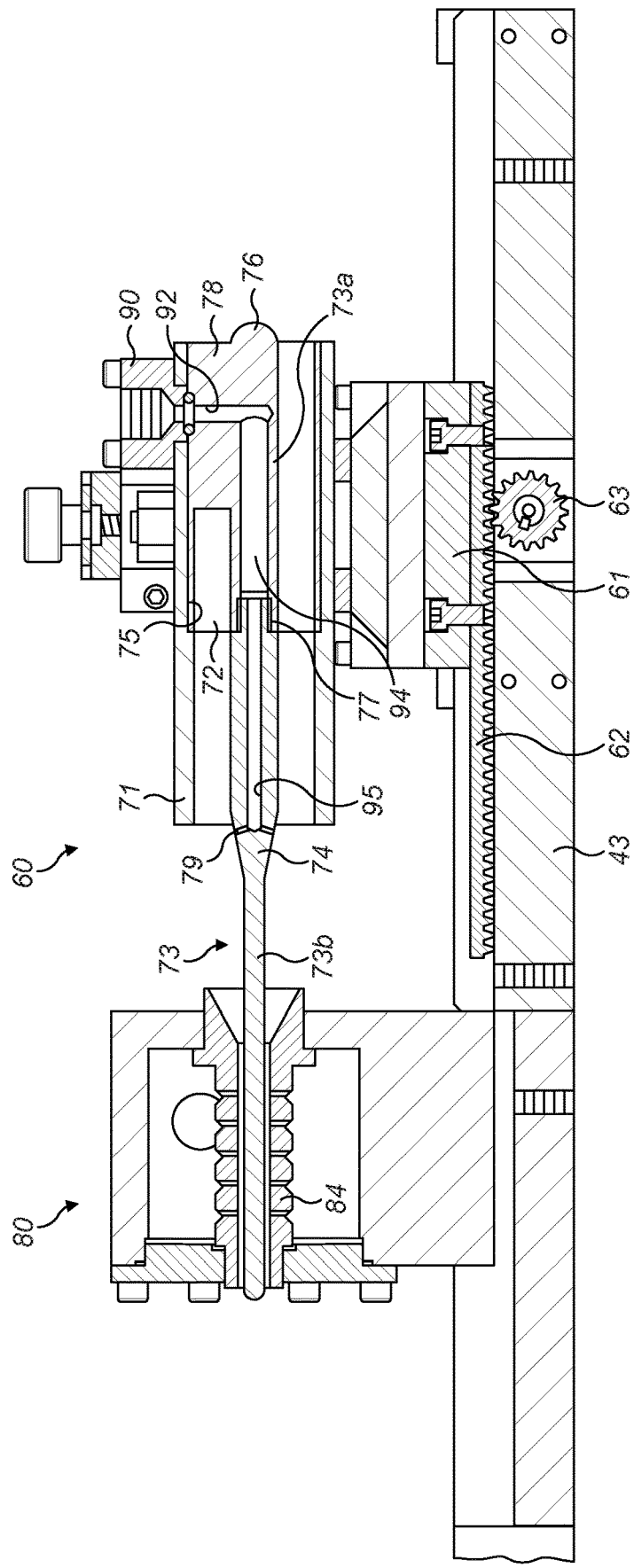
FIG. 5D is a longitudinal cross-section similar to that of FIG. 5B of the equipment of FIG. 1 carrying an alternative embodiment of a mandrel assembly.
Figure 5E:
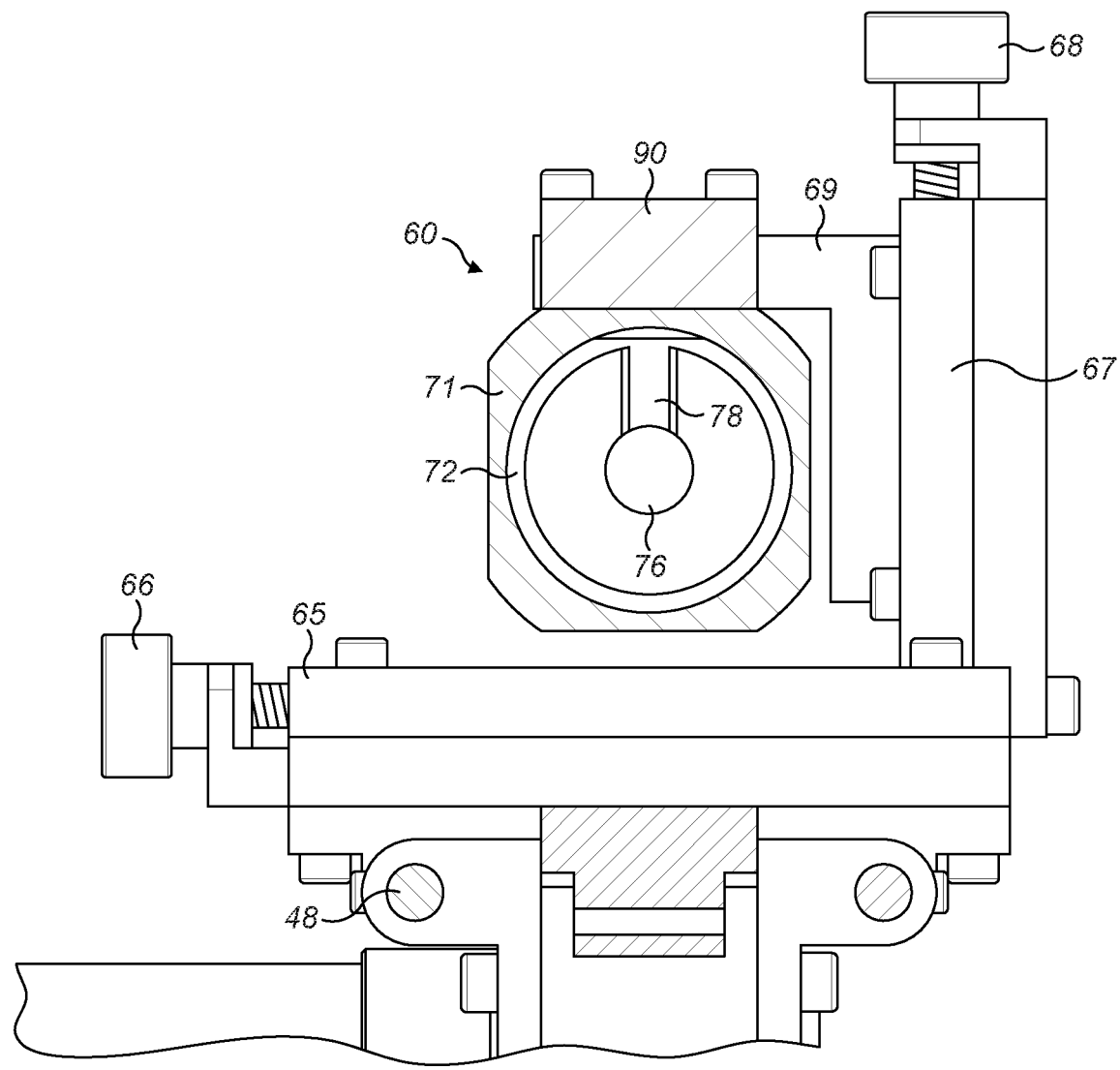
FIG. 5E is an end elevation of the mandrel assembly of FIG. 5D installed on the equipment, viewed from upstream.
Figure 6A:
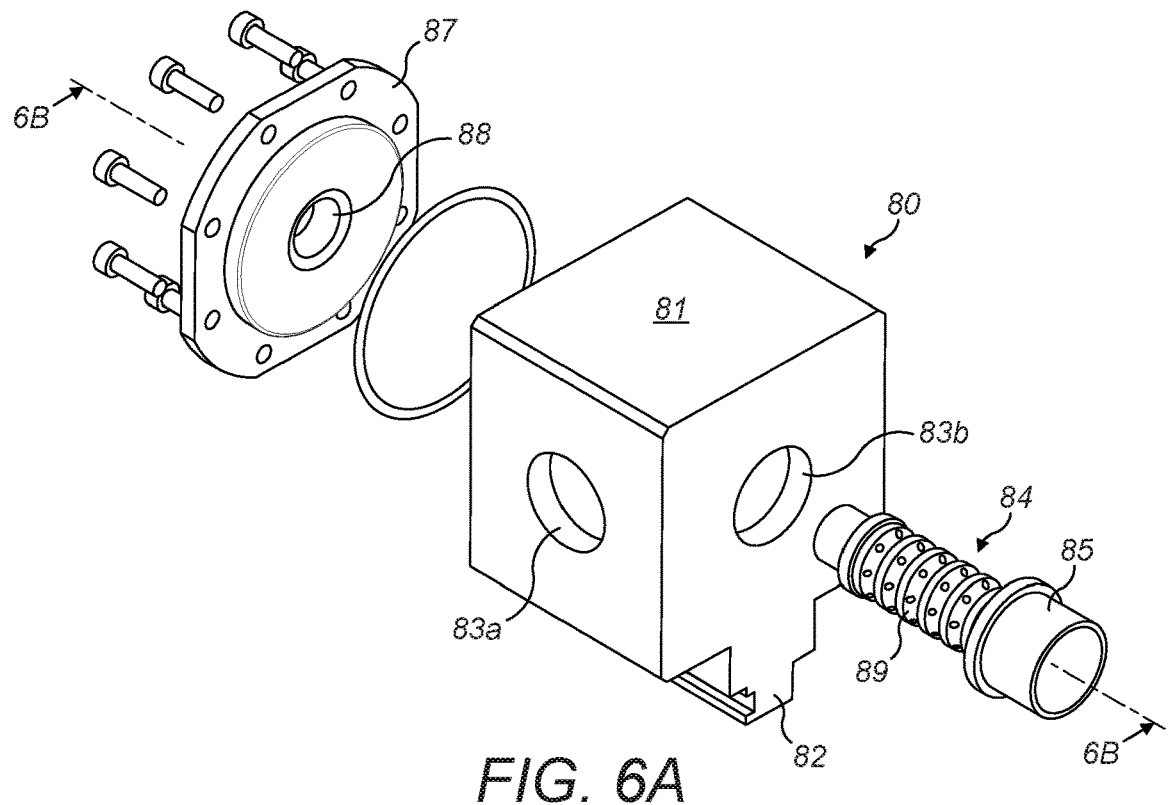
FIG. 6A is an exploded perspective view from above and one end of the treatment assembly of FIG. 5A, separated from the mandrel assembly.
Figure 6B:
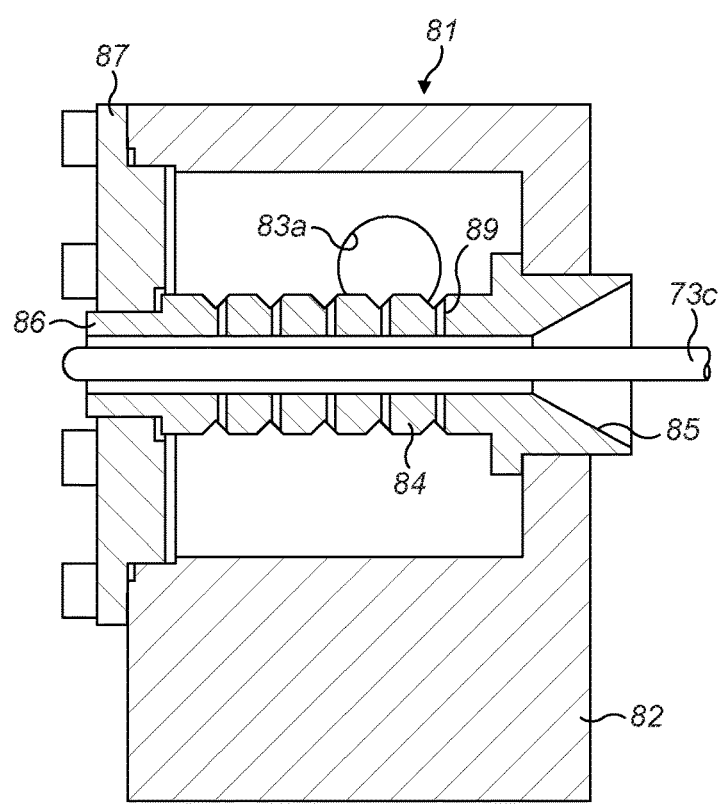
FIG. 6B is a vertical cross section through the assembly of FIG. 6A in the direction of arrows 6B-6B.
Figure 7A:
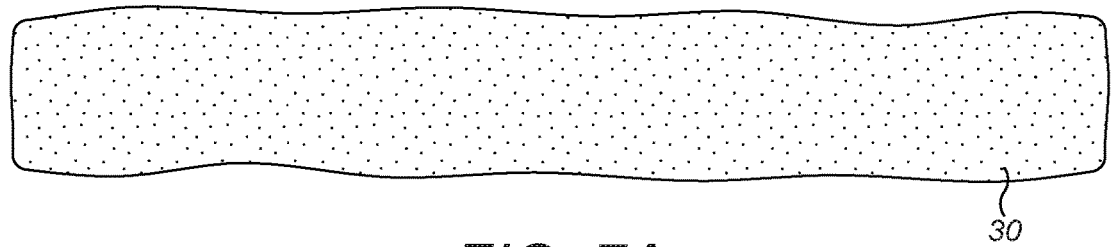
Figure 7B:
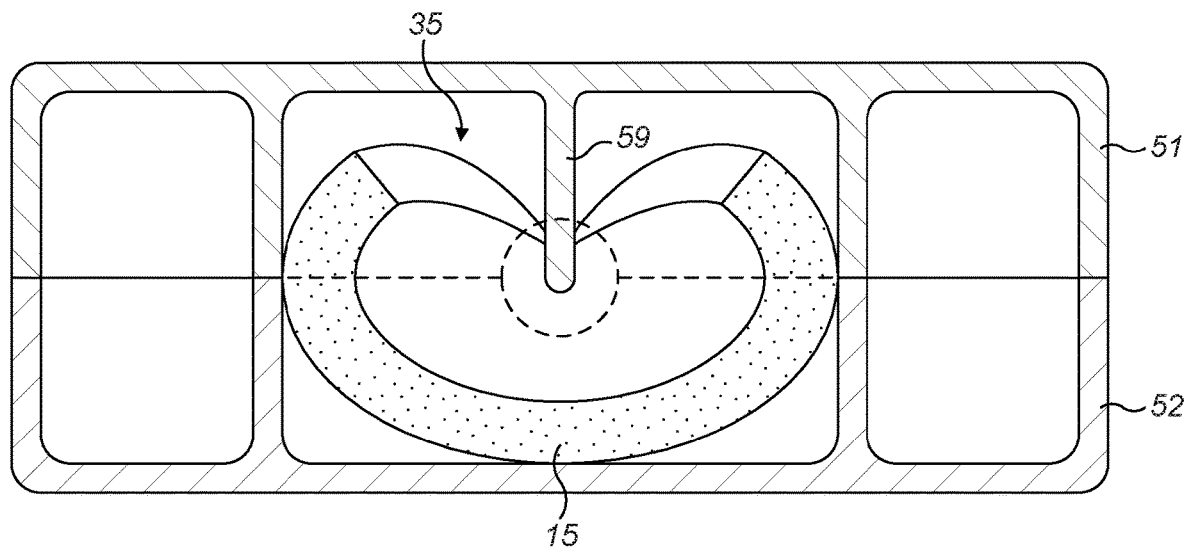

FIGS. 7A to 7G illustrate, in cross section, and perspective, the envelope of a bundle of fibrous material as successive stages to as it advances through the equipment of FIGS. 1 to 6B, taken along lines 7A, 7B, 7C, 7D, 7E, 7F and 7G of FIG. 1, in the upstream and downstream directions as indicated by the arrows, FIGS. 7A and 7B FIGS. 7C to 7G showing the bundle approximately to the same scale as each other, but reduced with respect to FIGS. 7A and 7B.

Figure 2:
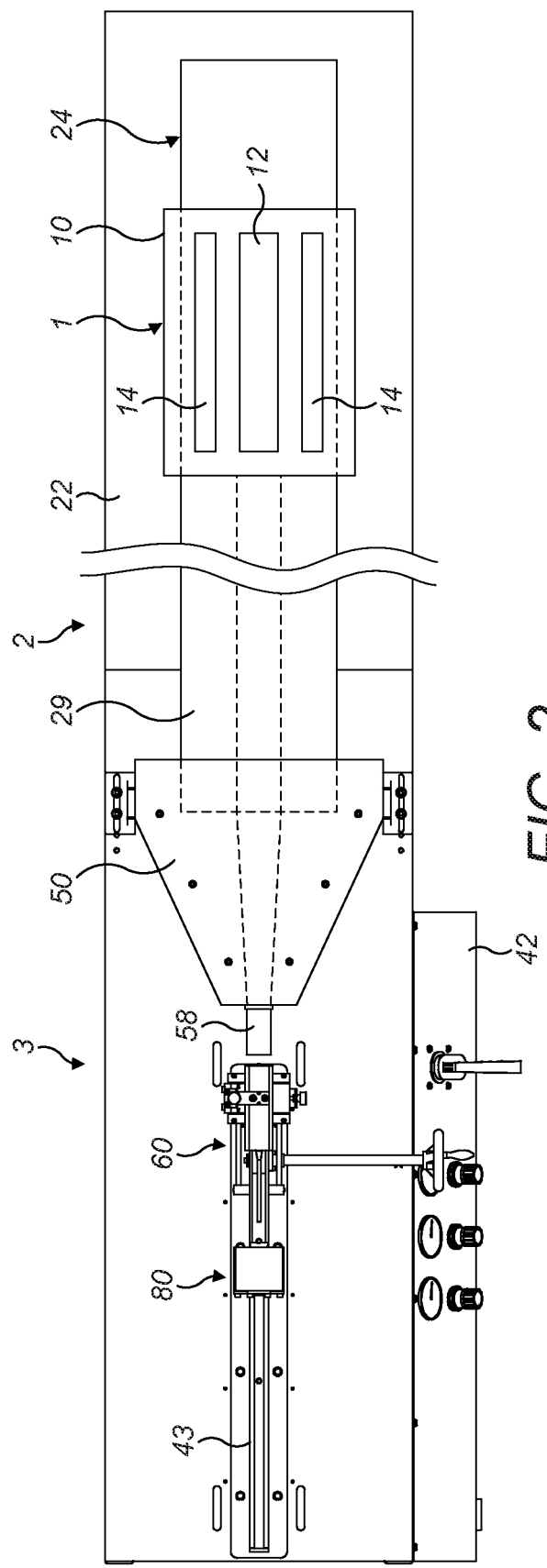
FIG. 2 is a schematic plan of the equipment of FIG. 1.
Figure 3:
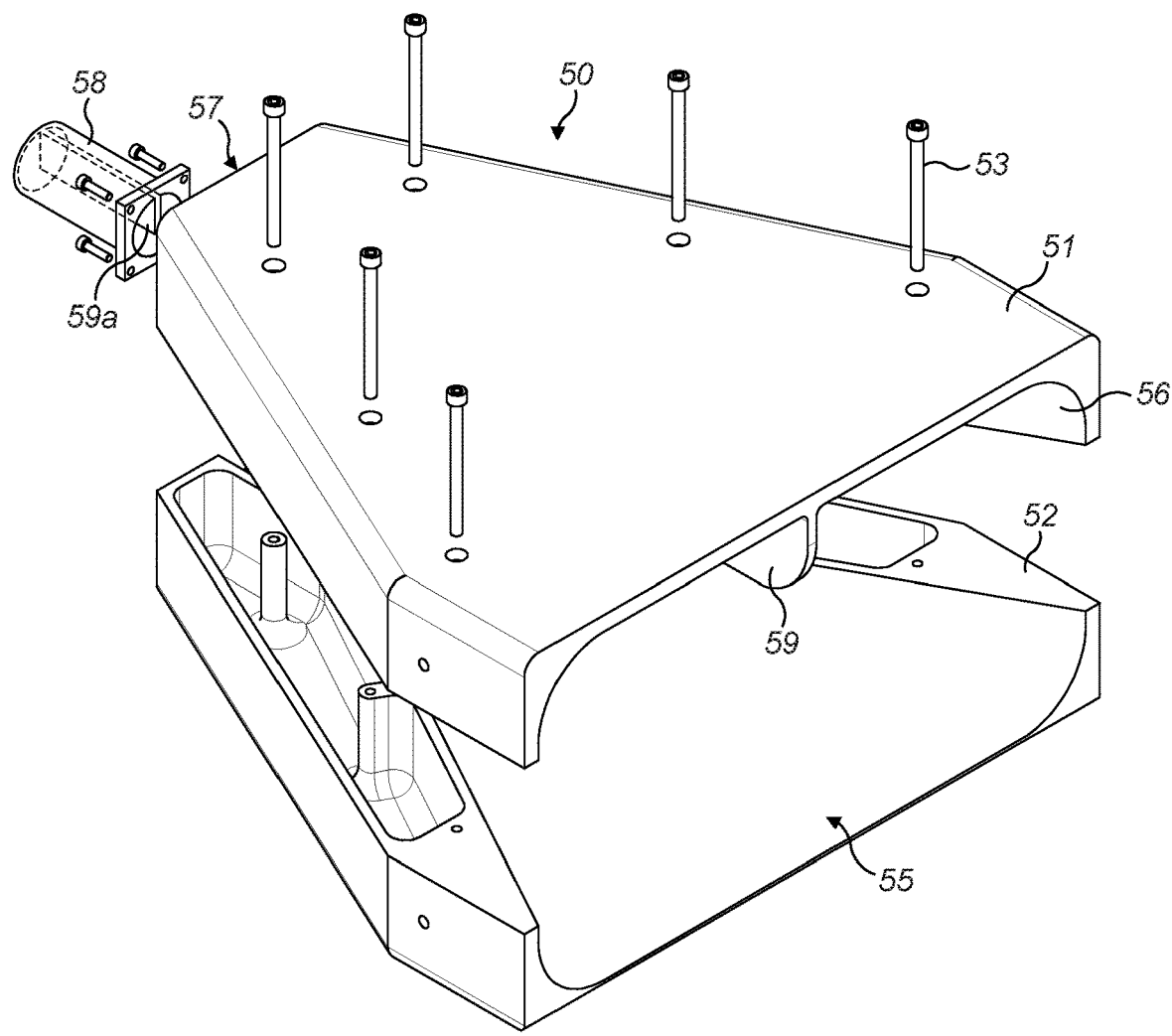
FIG. 3 is an exploded view of an embodiment of a forming cone that may be used in the equipment of FIGS. 1 and 2.
Figure 3A:
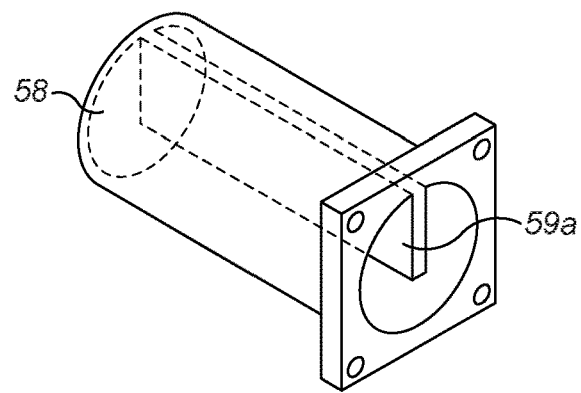
FIG. 3A is a perspective view, on an enlarged scale, of one component of the forming cone of FIG. 3.

Referring to FIGS. 1 and 2, the equipment illustrated is of modular construction and comprises a continuously operable fibre supply module 1, a fibre gathering module 2, in which the fibres are gathered into a bundle in the form of a continuous web, and a forming module 3 in which the bundle of fibres is formed continuously into a rod in the form of a hollow tube 5. In in this example the fibrous tube produced is suitable for use in the manufacture of filters for cigarettes.

Fibre Supply Module

The fibre supply module 1 comprises a melt-blowing head 10, the construction and operation of which will be familiar to persons skilled in the art, and is not illustrated in detail. In other embodiments, the fibre supply module may for example comprise a melt-spinning or an electro-spinning unit, or a feed system for the supply of an expanded web of fibres from a bale of filter tow material.

In the melt-blowing equipment illustrated, molten polymer material is fed into the melt-blowing head 10 through a polymer inlet manifold 12 and emerges from the head at an array of jets 13. Hot pressurised gas, normally air, may be introduced into the melt blowing head 10 through air inlet manifolds 14, 14 on either side of the polymer inlet manifold 12 and emerges from the array of jets in two convergent high velocity gas streams. The streams of hot gas blow the polymer emerging from the array of jets 13 into thin streams of molten polymer, which solidify within a few centimetres of the jets to form a multiplicity of continuous small diameter fibres 15. A complex pattern of entangled fibres entrained within a fast-flowing stream of gas is thereby formed.

The gathering module 2 is arranged vertically beneath the melt blowing head 10 to receive the fibres 15 entrained in the air stream from the head. The vertical distance between the melt blowing head and the fibre gathering module is exaggerated in FIG. 1 for clarity.

Fibre Gathering Module

The fibre gathering module 2 comprises a rigid frame 20 supporting a hollow casing 22 formed from metal plates welded or bolted together and secured to the supporting frame 22. The casing 22 is generally rectangular in plan with its major axis extending horizontally in a longitudinal direction from an upstream end, at the right-hand side of FIG. 1, to a downstream end, to the left in FIG. 1.

A conveyor 24 mounted on the casing 22 provides a transport system for moving fibres 15 from the melt blowing head 10 part of the way along a pathway 25 (the envelope of which is indicated by broken lines in FIG. 1 and partially in FIG. 2) through the fibre gathering module 2 to the rod forming module 3. The conveyor 24 comprises a tensioning roller 26 of relatively large diameter mounted in bearings fixed to the upstream end of the casing 22 for rotation about a horizontal axis that extends transversely of the casing. At the downstream end of the casing 22, an idler roller 27 and a drive roller 28, each of smaller diameter than the tensioning roller, are mounted in bearings fixed to the casing 22 for rotation about horizontal axes parallel to that of the tensioning roller 26, the idler roller 27 being mounted above and upstream of the drive roller 28. An electrical drive motor (not shown) is mounted in the downstream end of the casing 22 to rotate the drive roller 28 about its axis in an anticlockwise direction as seen in FIG. 1.

The three rollers 26, 27, 28 support a conveyor belt 29 of endless construction having an upper run that extends in the longitudinal direction of the casing 24 from the tensioning roller 26 along the upper surface of the casing 22 to the idler roller 27, downwardly and around the drive roller 28, and then back to the tensioning roller 26 in a lower run parallel to the upper run. The idler roller and the tensioning roller may be adjusted in their bearings to align the upper run accurately with the upper surface of the casing 22 and to provide sufficient tension in the conveyor belt.

The conveyor belt 29 is constructed to allow the passage of gas through the belt whilst fibrous material entrained with the gas is deposited and retained on its surface as a web of entangled fibres. For example, the conveyor belt 29, or at least part thereof, particularly the central region extending the length of the belt, may be provided with perforations, slots or apertures, or is otherwise made porous, to allow the passage of gas therethrough whilst supporting fibres 15 on its surface. For this purpose, the conveyor belt may for example be a fabric material woven to a density sufficient to permit a desired flow of gas therethrough under pressure.

The upper surface of the casing 22 is provided with apertures or slots that lie beneath the upper run of the conveyor belt 29, allowing gas to pass through the conveyor belt into the interior of the casing 22, from which air may be evacuated by a vacuum pump (not shown) and discharged away from the equipment. The portions of the upper surface of the casing immediately surrounding the apertures or slots provide support for the upper run of the conveyor belt 29.

Fibre Forming Module

The forming module 3 comprises a rigid frame 40 supporting a number of components of rod-forming equipment, for transforming the bundle of fibres 15 into the hollow tube 5, and a control panel 42 therefor. The rod forming equipment comprises a forming cone 50, a mandrel assembly 60 and a treatment assembly 80. The forming cone 50 is fixed to the frame 40 in alignment with the conveyor 24 of the gathering module 2. The mandrel assembly 60 and the treatment assembly 80 are adjustably mounted on a rail 43 in the form of an upwardly-open channel, which is secured to the frame 40 in alignment with the linear path of the fibres through the fibre gathering module 2. The longitudinal positions of the mandrel and treatment assemblies 60, 80 along the rail may be adjusted relative to each other and the forming cone as required to match the prevailing operating conditions of the equipment.

Forming Cone

Referring to FIGS. 3, 3A, 4A, 4B and 4C, the forming cone 50 comprises upper and lower half shells 51, 52 each being generally triangular in plan, and having a flat outer surface and a recessed inner surface. The half shells are secured together by bolts 53. The inner surfaces of the half shells together define a smoothly tapering central passage 55 extending from a generally rectangular upstream inlet 56 to a downstream outlet 57, which is in the form of a cylindrical tube of circular cross-section. A tubular outlet extension piece 58 (FIGS. 3 and 3A) is bolted to the half shells 51,52 in axial alignment with the outlet 57.

The inlet 56 is arranged to receive the gathered fibres 15 in the form of a flattened mat or web directly from the conveyor 24 of the fibre gathering module. The tapered central passage is shaped and arranged to compress the fibres and shape the web into a cylindrical shape as the fibres advance through the forming cone towards the outlet 57.

The interior surface of the upper half shell 51 is provided with a divider in the form of a rib 59 that projects radially inwardly towards the axis of the central passage 55 into the path of the fibres through the forming cone, and extends longitudinally from the inlet 56 and through the cylindrical tube of the outlet 57. The dividing rib 59 is narrow compared with the diameter of the outlet of the forming cone so that, as the bundle of fibres passes through the forming cone, the divider forms a gap or cleft along the length of the bundle. In order to facilitate the flow of the fibre bundle over the divider, the upstream end 59a of the rib is curved so that the extent to which the rib 59 projects radially towards the axis of the passage increases smoothly and progressively along the rib to a point A positioned inwardly of the inlet 56 at a distance of about 10 to 20% of the overall length of the divider. From this point A and downstream thereof, the rib extends marginally beyond the centre of the passage through the forming cone. The rib may for example have a radial projection marginally greater than 50% of the diameter of the outlet, for example up to 55%, 60% or 65% of the diameter of the outlet, depending upon the desired internal diameter of the finished tube formed from the fibres.

The outlet extension piece 58 is also formed with an axial internal rib 59a that has the same radial length and lies in the same plane as the rib 59 within the upper half shell, thereby forming a continuation of the divider in the upper half shell 51.

Mandrel Assembly

Referring to FIGS. 5A and 5B, the mandrel assembly 60 comprises a carriage 61 that is mounted for sliding movement along the upstream part of the rail 43 and supported by parallel guides 48, 48 attached to each side of the rail 43. The carriage includes a rack 62, which is received within the channel formed by the rail 43 and engages with a pinion wheel 63 mounted on the rail 43 for rotation about a transverse axis by a hand-wheel 64, enabling the mandrel assembly to be moved longitudinally back and forth along the rail 43 into a desired position in relation to the treatment assembly 80 and the forming cone 50.

The carriage 61 also includes a horizontal guide 65 for a first slide block 65a that is mounted in the guide for transverse movement relative to the carriage 61. The transverse position of the first slide block within the horizontal guide may be adjusted and fixed by means of a locking bolt 66. The first slide block 65a supports a vertical guide 67 for a second slide block 67a that is mounted therein for vertical movement relative to the carriage 61. The vertical position of the second slide block 67a within the vertical guide 67 may be adjusted and fixed by means of a locking bolt 68. The second slide block 67a carries a bracket 69 which in turn supports an axially-oriented tubular casing 71 which is open at each end. The casing houses a mandrel, indicated generally at 73, in the form of an elongated rod extending along the central axis of the casing 71. The longitudinal, vertical and horizontal position of the mandrel may therefore be set precisely relative to the forming cone and the treatment assembly 80 by movement of the carriage longitudinally along the track, and by adjustment of the first and second slide blocks 65a and 65b.

The tubular casing 71 for the mandrel 73 is generally square in external cross-section, with bevelled edges along its length, and generally cylindrical in internal cross-section, with a counterbore 75 in the upstream end of larger internal diameter than the downstream end of the casing. The casing 71 is secured to the bracket 69 by two bolts, and is aligned in the longitudinal direction, i.e. with its central axis arranged in the direction of travel of the bundle of fibres through the equipment.

A tubular mandrel support 72 is mounted within the counterbore 75 of the casing 71. The mandrel support has an external diameter conforming to the internal diameter of the counterbore 75 and is provided internally with a bracket or carrier for the mandrel 73. In this embodiment, the bracket is in the form of a divider plate 78 that projects radially inwardly from the internal surface of the mandrel support 72 and extends axially within the support from the upstream end thereof. The rotational position of the mandrel support 72 within the casing 71 is adjusted such that the plate 78 lies in a desired radial orientation, in this case vertical. The radial extremity of the divider plate 78 is connected to the mandrel 73 and may for example be formed integrally therewith as a moulding.

The mandrel 73 comprises an elongated cylindrical rod which, for ease of assembly is made in two parts arranged coaxially, an upper mandrel rod 73a and a lower mandrel rod 73b. The upper rod 73a is of uniform radial cross section with a diameter greater than the thickness of the divider plate to which it is connected, and is positioned by the plate along the central axis of the mandrel support 72 to project downstream into the support 72. The upstream end of the upper mandrel rod terminates in a domed portion or boss 76 that projects upstream, beyond the mandrel support into the path of travel of the bundle of fibres. The downstream end of the upper mandrel rod 73a is provided with an internally-threaded aperture, which extends parallel to the central axis of the rod.

The lower mandrel rod 73b has a cylindrical segment at its upstream end that corresponds in diameter to the upper mandrel rod 73a and, at its downstream end, a cylindrical segment 73c of reduced diameter, which corresponds to the desired internal diameter of the finished tubular filter rod 5. The two cylindrical segments of the lower mandrel rod are connected smoothly to each other by a tapered intermediate segment, as illustrated. The upstream end of the lower mandrel rod 73b carries a threaded axial bolt, which is received in the threaded aperture in the downstream end of the upper mandrel rod 73a, thereby fixing the two parts of the mandrel in coaxial alignment within the mandrel support 72 and the casing 71. The lower mandrel rod 73b may be removed and replaced by a similar component having a downstream end of a different diameter, according to the desired dimensions of the finished tubular rod 5.

The mandrel assembly 60 is configured to receive the bundle of fibres emerging from the outlet of the forming cone 50. The divider plate 78 of the mandrel support 72 is aligned radially with the divider ribs 59, 59a in the forming cone 50 and outlet extension piece 58 so that, as the bundle of fibres passes through the casing, the divider plate 78 maintains the formation of the cleft along the length of the bundle, as the domed portion 76 on the upstream extremity of the mandrel 73 plate is inserted into the cleft at the centre of the bundle of fibres. The divider plate 78 therefore serves the dual function of a bracket that carries the mandrel, and a divider for keeping open the cleft in the fibres formed upstream thereof.

Alternative Mandrel Assembly

An alternative mandrel assembly 60 for use in the equipment is described below, with reference to FIGS. 5D and 5E. The mandrel assembly 60 is of similar construction to that described with reference to FIGS. 5A, 5B and 5C, and in the drawings like parts are indicated by the same reference numerals.

In the mandrel assembly 60 of FIGS. 5D and 5E, the mandrel 73 is modified to enable a gaseous or liquid treatment fluid, e.g. steam or water vapour, to be delivered to the fibre bundle as the bundle passed over the mandrel. To this end, the upstream end of the casing 71 is provided on its upper surface with an inlet for a steam line (not shown). The inlet comprises a gas-tight connection 90 having a central passage that communicates with a radial bore 92 in the divider plate 78. The bore 92 extends radially downwardly to the centre line of the mandrel, where the bore communicates with a central axial passage 94 in the upper mandrel rod 73a. The axial passage 94 extends to the threaded aperture in the downstream end of the upper mandrel rod. The lower mandrel rod 73b is likewise provided with a central axial passage 95, which is aligned with the passage 94 in the upper mandrel rod 73a. The axial passage 95 extends through the threaded bolt 77 on the upstream end of the lower mandrel rod and terminates at the centre of the tapered intermediate segment 74 of the mandrel. The intermediate segment 74 is provided with four outlet vents 79 that connect the axial 95 to the external surface of the lower mandrel rod in order to discharge the treatment fluid into the fibre supported on the mandrel 73. The vents are disposed at equiangular intervals (90°) around the axis of the mandrel and are inclined in the downstream direction at an angle of 20-70° to the central axis of the mandrel in the direction of movement of the fibre bundle over the mandrel.

In this embodiment, steam or other treatment fluid may be fed into the mandrel 73 through the connector 90. The steam may then pass to the vents 79, where it contacts the fibre bundle as it is advanced through the equipment and passes over the surface of the mandrel. Treatment of the fibres with steam at this stage increases the flexibility and pliability of the fibres, thereby pre-conditioning the fibres for further treatment in the treatment unit 80.

Treatment Unit

The treatment unit 80, positioned downstream of the mandrel assembly 60 is in the form known to those skilled in the art as a steam block, illustrated in more detail in FIGS. 6A and 6B. The treatment unit is a die assembly that includes a die 84, in which the fibre bundle is formed into its final configuration, and structural components for heating the die and for treating the fibres with steam to cure the shaped fibre bundle.

The assembly comprises a housing 81 defining a hollow cuboidal chamber and is provided with a mounting bracket 82 by which the housing may be mounted for sliding movement back and forth along the downstream part of the rail 43. The treatment unit may be locked in any one of several discrete locations along the rail defined by a row of bolt holes 44. A locking pin on the mounting bracket 82 can engage with the bolt holes to secure the treatment unit in a selected position on the rail 43.

The lateral faces of the housing 81 are each provided with an aperture 83a for receiving steam connectors (not shown) through which steam may be introduced into the housing. The upstream and downstream faces of the housing are each provided with an aperture 83b for supporting a cylindrical die 84. The die 84 is tubular, with a central axial passage of a diameter sufficient to receive the downstream segment 73c of the mandrel 73 and to define an annular gap between the mandrel 73 and the cylindrical wall of the passage equal to the desired annular thickness of the tube of fibres.

The cylindrical wall of the die 84 is provided with passages 89 placing the central axial passage of the die in communication with the exterior surroundings. The upstream end of the die carries a socket 85 with an interior surface in the form of a cone that is tapered in the downstream direction form a diameter equal to or smaller than the downstream outlet from the mandrel support 72, (e.g. 70%, 60%, 50%, or 40% smaller) to a diameter equal to the desired external diameter of the finished tubular filter rods. The die 84 can be installed in the housing 81 so that its downstream end 86 projects out of the aperture in the downstream face of the housing, and the socket 85 is sealingly engaged in the aperture 83 in the upstream face of the housing. A sealing plate 87, having a central aperture 88 for receiving the downstream end of the die, may be bolted to the housing and sealed thereto by O-rings.

The treatment unit is constructed and arranged so that superheated steam may be passed from a supply line through the chamber of the housing 81 via the apertures 83, by way of a valve (not shown) controlled from the control panel 42. The steam may pass from the chamber through the passages 89 in the die 84 and into contact with the fibres supported on the downstream end of the mandrel 75, heating the fibres to a temperature at which they fuse together at their point s of contact, thereby fixing the fibres in their tubular configuration.

The fibre bundle is drawn through the equipment by take-off rollers (not shown) of conventional construction positioned downstream of the treatment unit. The movement of the fibres through the equipment may also be assisted by means of a stuffer jet (not illustrated), locate for example between the forming cone 50 and the mandrel assembly 60.

Use and Operation of Equipment and Manufacturing Process

The use of the equipment in a continuous manufacturing process for producing tubular rods of fibrous material will now be described. The process described broadly comprises gathering the fibres into a bundle, parting the fibres along the length of the bundle advances to form a radial cleft, advancing the bundle over a mandrel positioned in the recess, closing the fibres of the bundle around the mandrel, treating the bundle to fix the bundle in a tubular configuration, and removing the bundle from the mandrel.

In the fibre supply module 1, the melt blowing head 10 is supplied with molten polymer and hot gas. The molten polymer emerges as a liquid through the array of jets 13 and is blown by the hot air into thin streams which solidify to form small diameter fibres 15 and become entrained in the gas stream.

The melt blowing head may be configured to produce mono-component fibres from a single polymer material or bi-component fibres having a core formed from a first polymer encased in a sheath formed from a different polymer. For the production of tubular filter rods, mono-component fibres may for example be formed from polyester, polyamide, ethyl vinyl acetate, polyvinyl alcohol or cellulose acetate, optionally incorporating other materials for modifying the properties of the polymer, for example a plasticiser such as triacetin. Bi-component fibres may be formed from any combination of compatible polymers, having for example, a core of polypropylene and a sheath of cellulose acetate, optionally incorporating a triacetin plasticiser.

Using air as the blowing gas, the die head is typically positioned 25-65 cm above the upper run of the conveyor belt 29 and is operated with an air temperature of 250-350° C., 350° C., e.g., 300-320° C., an air flow rate of 500-600 cubic feet or 14,000-17,000 litres per minute, and a polymer throughput of 0.3-0.5 grams per jet hole per minute. The resulting fibres typically have a diameter of 5-10 microns, e.g. about 7 microns and can be gathered to form a tubular filter rod 5 having an external diameter of 5-10 mm, for example 7 to 9 mm, e.g. about 8 mm (particularly 7-7 mm), an internal diameter of 1 to 6 mm, for example 2 to 5 mm and a weight of from 5 mg per millimetre length of the rod, typically from 8 to 12 mg/mm e.g. about 10 mg/mm.

The stream of gas and entrained fibres 15 is directed on to the conveyor 24, and the fibres gather together in an entangled mat on the upper run of the conveyor belt 29 The conveyor 24 is operated to move the belt 29 in the anti-clockwise direction as seen in FIG. 2, thereby moving fibres out of the gas stream and downstream towards the forming module 3.

The resulting web 30 of gathered fibres is drawn continuously into and through the forming cone 50. FIG. 7A illustrates the generally rectangular cross-sectional shape of the web of fibres 15 immediately before it enters the forming cone 50. For example, the web may be 150 mm in width and 20 mm in thickness or "loft". As the web travels through the forming cone, the fibres 15 are guided and compressed into a bundle 32 of increasingly cylindrical shape. The cross-sectional shape of the web at a point about half way thought the cone 50, indicated by the section line 7B in FIG. 1, is illustrated schematically in FIG. 7B. At this point, as the web advances through the forming cone, the longitudinal edges of the web are compressed towards the central axis of the forming cone, and the fibres are moved towards and over each other both laterally and vertically in a complex folding operation to lie on either side of and below the divider rib 59 as they approach the tubular outlet 57, which is of circular radial cross-section.

Within the forming cone, the density of the fibres within the bundle increases progressively along the axis of the cone from a relatively low density at the inlet to a higher density at the outlet 57. The cross-sectional density of the bundle is not uniform. At each point along the length of the bundle, the fibre density increases in the radial direction from a void or low density region at the centre of the bundle to a higher density region at the periphery of the bundle.

As the web of fibres advances through the forming cone, the divider rib 59 separates the fibres in the upper part of the bundle to form a cleft 35 along the length of the bundle. In the embodiment illustrated, the divider rib forms a cleft that penetrates up to and marginally beyond the centre of bundle, making the depth of the cleft between 50 and 60% of the diameter of the bundle, e.g. about 55%.

Figure 7C:
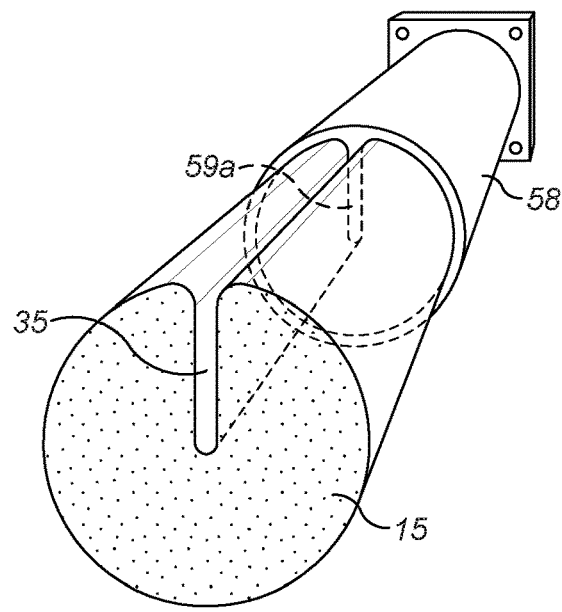

As illustrated in FIG. 7C, when the bundle of fibres 15 emerges from the outlet extension piece 58 of the forming cone, its envelope is cylindrical in shape with a diameter of about 15-25%, e.g. about 20% of the width of the web as it enters the forming cone and is formed with a cleft 35 along its length.

Figure 7D:
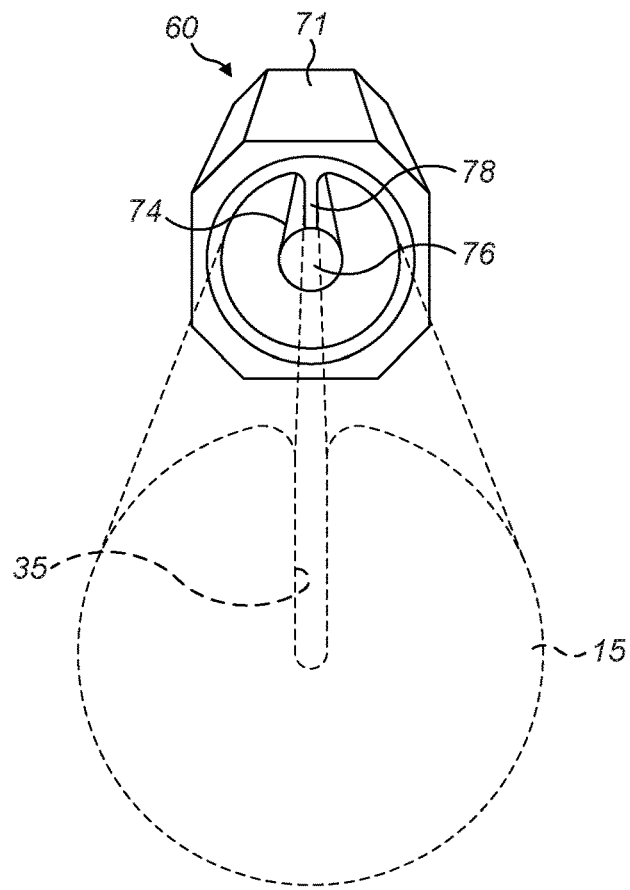

The bundle then passes downstream from the forming cone into the mandrel assembly 60. FIG. 7D illustrates schematically, looking downstream, the configuration of the bundle of fibres 15 as it enters the mandrel assembly, the envelope of the bundle being indicated in broken lines. The divider plate 78 registers with the cleft 35 that has been formed in the bundle of fibres upstream by the divide in the forming cone, and hold the cleft open as the fibres pass on either side of and below the divider plate. The boss 76 on the tip of the upper mandrel rod 73a initiates an opening movement of the fibres at the centre of the bundle to make way for the upper mandrel rod 73a, which is inserted into the centre of the bundle and expands the fibres to form a central axial passage 36 in the bundle of fibres.

Figure 7G:
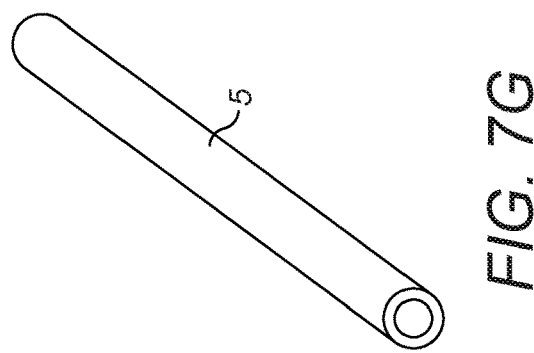
Figure 7F:
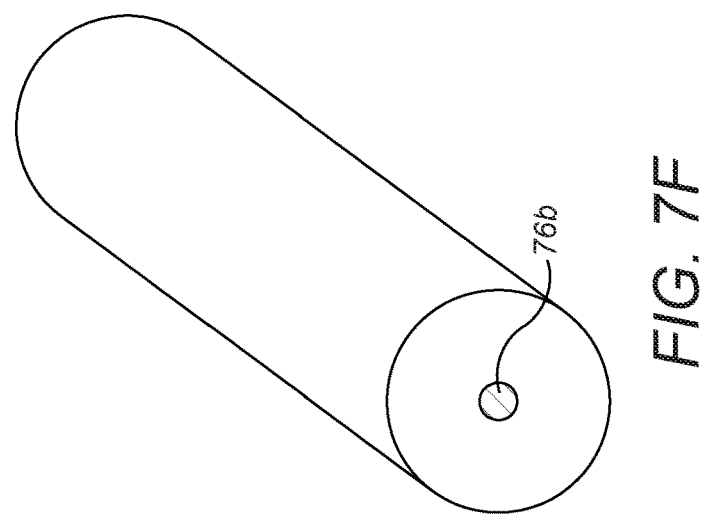
Figure 7E:
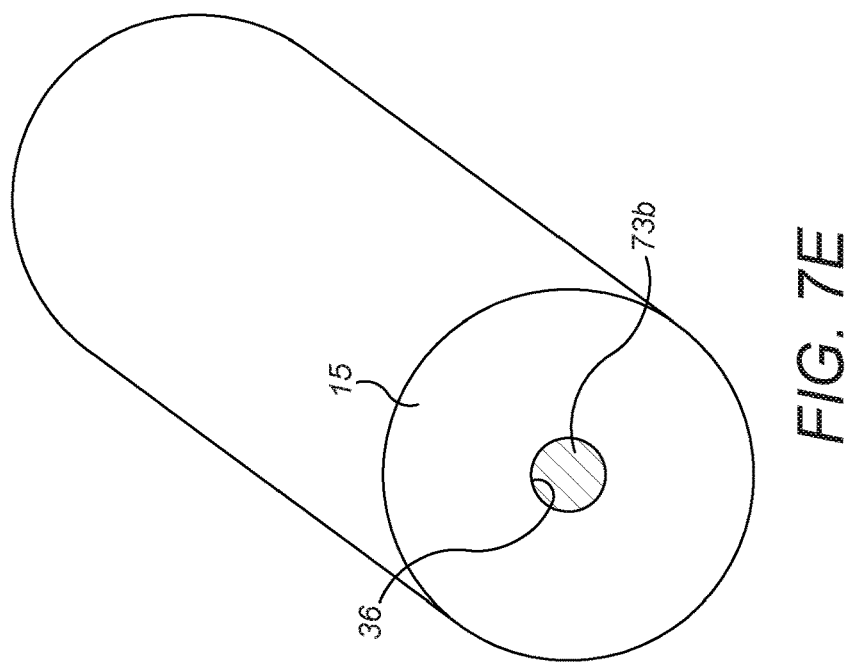

As the bundle advances over the upper mandrel rod downstream from the divider plate 78 and on to the lower mandrel rod 73b, the cleft in the fibre bundle begins to close around the mandrel and the fibres form a continuous peripheral layer around the wider diameter segment of the lower mandrel rod 73b, as illustrated in FIG. 7E. At this point, the central passage 36 has a diameter larger than the desired internal diameter of the finished tube, e.g. 10%, 15%, 20%, or 30% larger.

As the bundle advances downstream out of the mandrel support 72 and the casing 71 towards the treatment assembly 80, it passes from the wider-diameter segment 73b of the upper mandrel rod on to the smaller-diameter segment 73c of the lower mandrel rod, which has a diameter corresponding to the desired internal diameter of the finished tubular rod. As the bundle approaches and enters the die 84, the tapered socket 85 of the die 84 compresses the bundle of fibres around the downstream segment 73c of the mandrel, completing the closure of the cleft and producing a tubular structure about the mandrel with an external diameter corresponding to the desired external diameter of the finished tube.

If a mandrel assembly constructed in accordance with FIGS. 5D and 5E is used, steam may be passed into the mandrel 73 and applied to the fibre bundle as it passes over the mandrel, thereby conditioning the fibres and facilitating compression around the lower mandrel rod 73b as it enters the die 84.

FIG. 7F illustrates the configuration of the bundle of fibres at the point of entry into the socket 85 of the die, and FIG. 7G illustrates the configuration of the tubular rod immediately downstream of the die 84, after passing over the downstream end of the mandrel. Typically, the external diameter of the rod will be 10-20% e.g. 15% of the diameter of the bundle of fibres at the downstream end of the mandrel assembly illustrated in FIG. 7E. The tubular structure emerging from the die has the desired internal and external diameters of the finished product. Tubes of different sizes and different combinations of internal and external diameters may be produced by using dies of different internal diameters in combination with mandrels of different diameters.

As the bundle travels through the steam block whilst supported by the mandrel, it is contacted under pressure, for example at a pressure of 1-3 bar, typically about 1.5 bar, with superheated steam produced for example by heating steam to a temperature in the range 150200° C. This treatment causes the fibres to bond together at their points of contact, thereby forming a bonded, self-supporting structure in the form of a tubular rod 5, as illustrated in FIG. 7G.

The rod 5 may then be drawn from the mandrel and then through further processing equipment for example an air block, to remove excess water from the rod, and a cutting machine which severs the rod into consecutive tubular segments of a desired length, as illustrated in FIG. 7F.

In the embodiments of the process disclosed herein, a critical point in the process is the insertion of a mandrel into the centre of the fibre bundle, with the objective of forming a central support around which a tubular structure can be formed. A risk arises in the use of a mandrel, particularly when the process is operated at high speed, that the fibres fail to distribute themselves uniformly around the mandrel, and collapse into a non-tubular structure, non-cylindrical structure. In the embodiments described herein however, the formation of a cleft in the fibre bundle before it is passed over the mandrel controls and stabilises the movement of the fibres into a tubular configuration, facilitating the formation of a tubular structure, and reducing the incidences of collapse of the tubular structure.

The invention claimed is:

1. A method of forming a tubular rod of fibrous material using equipment for forming a tubular rod of fibrous material, the equipment including gathering equipment constructed to receive a continuous supply of fibers from said fiber supply module,
   a divider arranged in a path of a plurality of fibers emerging from a fiber supply module,
   a mandrel assembly comprising an open-ended tubular casing configured to receive the bundle of fibers, and a mandrel mounted in the casing and positioned downstream of the divider, the mandrel having a mandrel support including a divider plate that carries the mandrel and which extends between the mandrel and the casing, the divider plate being located downstream of the divider, and
   a die constructed and arranged to cooperate with the mandrel, wherein the die is positioned downstream of the casing of the mandrel assembly, wherein the method comprises:
   producing a plurality of fibers using a melt-blowing process in said fiber supply module,
   gathering said fibers into an elongated bundle using said gathering equipment constructed to receive a continuous supply of fibers from said fiber supply module,
   parting the fibers using the divider to form a cleft along a length of the bundle as the bundle advances through the gathering equipment,
   introducing the mandrel into the cleft so that the mandrel and the die cooperate to close the fibers of the bundle around the mandrel in a tubular configuration,
   keeping the cleft formed in the bundle by the divider open as the bundle of fibers passing through the casing over the mandrel by aligning the divider plate of the mandrel assembly with the divider,
   forming the fibers in a tubular configuration around the mandrel by passing the bundle of fibers through the die, and
   separating the fibers from the mandrel as a tubular rod.

2. A method according to claim 1, wherein the cleft is formed as a recess extending partially through the bundle.

3. A method according to claim 1, wherein the cleft is formed to extend radially from a periphery of the bundle to the center of the bundle.

4. A method according to claim 1, wherein the cleft is formed to extend 50%, 60%, or 70% of thickness of the bundle.

5. A method according to claim 1, wherein the cleft divides the bundle into two parts.

6. A method according to claim 1, wherein a treatment fluid is delivered to the bundle of fibers as the bundle passes over the mandrel.

7. A method according to claim 6, wherein the treatment fluid is delivered from within the mandrel.

8. A method according to claim 1, wherein the fibers are supplied from a feedstock of fibrous material.

9. A method according to claim 1, wherein the fibers are supplied by a continuous manufacturing process.

10. A method according to claim 1, wherein the bundle of fibers is treated to fix the bundle in a tubular configuration.

11. A method according to claim 10, wherein the bundle of fibers is advanced through a constriction that defines a desired circumferential profile for the bundle of fibers, and a treatment fluid for curing the fibers is introduced into the bundle as the fibers enter the constriction.

12. Equipment for forming a tubular rod of fibrous material from a plurality of fibers produced by a fiber supply module using a melt-blowing process comprising:
   gathering equipment constructed to receive a continuous supply of fibers from said fiber supply module and to gather the fibers into a bundle as the fibers advance through the gathering equipment;
   a divider arranged in a path of the fibers through the gathering equipment and constructed to form a cleft along a length of the bundle as the bundle advances through the gathering equipment;
   a mandrel assembly comprising an open-ended tubular casing configured to receive the bundle of fibers, and a mandrel mounted in the casing and positioned in the path of the bundle of fibers downstream of the divider, the mandrel comprising a mandrel support including a divider plate that carries the mandrel and which extends between the mandrel and the casing, the divider plate being in alignment with the divider to keep the cleft formed in the bundle by the divider upstream of the divider plate open as the bundle of fibers passes through the casing and advances over the mandrel; and
   a die positioned downstream of the casing of the mandrel assembly, the die being constructed and arranged to cooperate with the mandrel to form the fibers in a tubular configuration around the mandrel.

13. Equipment according to claim 12, wherein the gathering equipment comprises a forming cone having an inlet for receiving the fibers, an outlet from which a web of fibers may be withdrawn as a bundle, and the forming cone defines a longitudinally extending passage of tapering configuration between the inlet and the outlet.

14. Equipment according to claim 13, wherein the divider comprises a projection in the passage of the forming cone extending between the inlet and the outlet.

15. Equipment according to claim 12, wherein the mandrel comprises a passage for delivering a treatment fluid to the bundle of fibers as the bundle passes over the mandrel.

16. Equipment according to claim 12, wherein the die is constructed and arranged to form the fibers around the mandrel into a tubular external shape.

17. Equipment according to claim 16, wherein the die comprises a body having a central passage therethrough, and the mandrel comprises a rod mounted within the central passage to define a tubular space between the body and the mandrel.

18. Equipment according to claim 12, further comprising a treatment station in which the fibers may be cured whilst supported on the mandrel.

19. Equipment according to claim 18, wherein the treatment station comprises a housing defining a chamber into which a treatment fluid may be introduced, and the die is positioned within the housing and is provided with one or more conduits for delivering the treatment fluid from the chamber to the fibers.

* * * * *